United States Patent [19]
van den Berg

[11] Patent Number: 5,913,281
[45] Date of Patent: Jun. 22, 1999

[54] IMPLEMENT FOR MILKING ANIMALS AND SEPARATING THE FOREMILK FROM THE MILK YIELD

[75] Inventor: Karel van den Berg, Bleskensgraaf, Netherlands

[73] Assignee: Maasland N.V. a Dutch limited liability company, Massland, Netherlands

[21] Appl. No.: 08/899,888

[22] Filed: Jul. 24, 1997

Related U.S. Application Data

[63] Continuation of application No. PCT/NL96/00464, Nov. 22, 1996, abandoned.

[30] Foreign Application Priority Data

Nov. 24, 1995 [NL] Netherlands ............................ 1001740
Feb. 28, 1996 [NL] Netherlands ............................ 1002472
Oct. 4, 1996 [NL] Netherlands ............................ 1004196

[51] Int. Cl.$^6$ .................................. A01J 5/00; A01J 7/04
[52] U.S. Cl. ...................................... 119/14.18; 119/14.02
[58] Field of Search .............................. 119/14.02, 14.03, 119/14.08, 14.18, 14.43, 14.46, 670, 14.32, 14.34, 14.55

[56] References Cited

U.S. PATENT DOCUMENTS

| | | | |
|---|---|---|---|
| 4,061,504 | 12/1977 | Zall et al. | 134/95 |
| 4,174,721 | 11/1979 | Wuchse | 134/58 R |
| 4,190,020 | 2/1980 | Tamas et al. | 119/14.08 |
| 5,052,341 | 10/1991 | Woolford et al. | 119/14.02 |
| 5,080,040 | 1/1992 | van der Lely et al. | 119/14.09 |
| 5,085,172 | 2/1992 | Borgman et al. | 119/14.09 |
| 5,275,124 | 1/1994 | Van Der Lily et al. | 119/14.08 |

FOREIGN PATENT DOCUMENTS

| | | | |
|---|---|---|---|
| 0 399 604 B1 | 11/1990 | European Pat. Off. | A01J 7/00 |
| 0 516 246 B1 | 12/1992 | European Pat. Off. | A01J 7/00 |
| 0 630 557 A2 | 12/1994 | European Pat. Off. | A01J 7/00 |
| 0 630 558 A2 | 12/1994 | European Pat. Off. | A01J 7/00 |
| 0 682 862 A2 | 11/1995 | European Pat. Off. | A01J 7/02 |

OTHER PUBLICATIONS

International Search Report, PCT/NL96/00464, EPO/ISA, Jul. 7, 1997 (3 pages).

*Primary Examiner*—Robert P. Swiatek
*Assistant Examiner*—James S. Bergin
*Attorney, Agent, or Firm*—Penrose Lucas Albright

[57] ABSTRACT

An apparatus for milking animals, such as cows, which comprises a milking compartment including a milking robot for automatically connecting teat cups to the teats of an animal to be milked in the compartment and automatically milking the animal. The apparatus is additionally provided with a milk container for receiving the milk from the animal. In at least one milk line and preferably in each of the milk lines, an auxiliary reservoir is disposed between the teat cups and the milk container. A fixed quantity of milk, in particular the foremilk, usually obtained at the commencement of the milking process, is collected in the auxiliary reservoir. Milk obtained thereafter is primarily guided to the milk container.

38 Claims, 1 Drawing Sheet

IMPLEMENT FOR MILKING ANIMALS AND SEPARATING THE FOREMILK FROM THE MILK YIELD

RELATED APPLICATIONS

This patent application is a continuation of PCT/NL96/00464 (International Publication Number 97/18701), filed Nov. 22, 1996 and abandoned Jul. 24, 1997.

FIELD OF THE INVENTION

The present invention relates to an implement for milking animals, such as cows, comprising a milking compartment including a milking robot for automatically connecting teat cups to the teats of an animal to be milked, which implement is additionally provided with milk container means for the milk yielded.

SUMMARY OF THE INVENTION

When milking animals in a suchlike implement, it is important that the foremilk is automatically separated from the further milk, because the foremilk is often somewhat infected and/or is of a different quality. For that reason, in accordance with the invention, the implement is characterized in that in at least one milk line, between a teat cup and the milk container means, there is disposed an auxiliary reservoir, in which a fixed quantity of milk, obtained particularly at the start of the milking process, is collected, whereby the milk obtained thereafter is mainly guided to the milk container means. When the foremilk of each of the udder quarters has to be collected, while the milk stream from the separate udder quarters does not start at the same time, e.g. because the teat cups are connected to the teats one after the other, it is important that in each of the milk lines, between a teat cup and the milk container means, there is disposed an auxiliary reservoir. In order to separate the foremilk in an adequate manner from the milk obtained thereafter, the content of the auxiliary reservoir will have to be larger than the quantity of foremilk to be expected. The content of the auxiliary reservoir should preferably be approximately two to three times as large as the quantity of foremilk to be expected.

In a particular embodiment, the auxiliary reservoir is in open connection with the relevant milk line between a teat cup and the milk container means. Because of this the milk yielded first will automatically fill the auxiliary reservoir and, when the latter is full, the subsequent milk stream will be guided to the milk container means. In another embodiment, there is included in the relevant milk line a connecting element to which the interrupted ends of the milk line are connected, which connecting element is provided at its lower side with an opening to which the auxiliary reservoir is connected. In order to prevent foremilk from flowing beyond this opening to the milk container means, both ends of the milk line are connected to the connecting element, in a substantially horizontal plane, so as to face each other in a staggering position. In this manner the connecting element constitutes a resistance ensuring that the first milk, so including the foremilk, gets into the auxiliary reservoir and only when the latter is entirely filled, the milk obtained thereafter is allowed to flow to the milk container means.

For the purpose of discharging the milk collected in the auxiliary reservoir, in accordance with the invention, said reservoir is provided with an outlet valve, which closes off the auxiliary reservoir because of the vacuum present in the milk line. This outlet valve releases the outlet opening of the auxiliary reservoir when, after milking, the teat cup comes in open connection with the open air, or when the teat cup is included in a rinsing line system only intended for cleaning the teat cup, or when the teat cup is included in a rinsing line system and rinsing of the teat cup and the milk line connected thereto is ended. In other words, as soon as an animal has been milked out and a relevant teat is disconnected, the vacuum in said teat cup and the milk line connected thereto is removed and the outlet valve of the relevant auxiliary reservoir is released, so that the milk present in the auxiliary reservoir can flow away. However, also when the milk line system has to be cleaned and a rinsing fluid is brought into the teat cup and the milk line connected thereto in a customary manner by means of rinsing members connected to a teat cup, because of the fact that the auxiliary reservoir is then, of course, filled with rinsing fluid, said rinsing fluid will have to be discharged as soon as the teat cup is disconnected from the rinsing member. In order to avoid that the milk flowing out of the auxiliary reservoir each time gets onto the floor and flows away, the auxiliary reservoir has an outlet opening debouching into a collecting element. In other words, the milk, and in particular the foremilk, is collected in a special collecting element. The (fore)milk collected therein after one or more milking runs can be utilized further; this also applies for the rinsing fluid collected in the auxiliary reservoir, in particular when said rinsing fluid does not contain chemical components that are harmful for the animals, but substantially consists of water containing milk, residues if any. For that purpose, in accordance with the invention, the foremilk separated by means of the auxiliary reservoir and/or, when the relevant teat cup would be included in a rinsing line system, the rinsing fluid discharged via the auxiliary reservoir is supplied to an implement for supplying feed and/or beverage to an animal. In this manner, neither the milk collected in the auxiliary reservoir, and in particular the foremilk, nor, insofar as water is used as a rinsing fluid, the water containing milk residues if any, flowing out of the auxiliary reservoir, needs to be wasted.

BRIEF DESCRIPTION OF THE DRAWINGS

For a better understanding of the invention and to show how the same may be carried into effect, reference will now be made, by way of example, to the accompanying drawings, in which.

DESCRIPTION OF THE PREFERRED EMBODIMENTS

Figure 1:
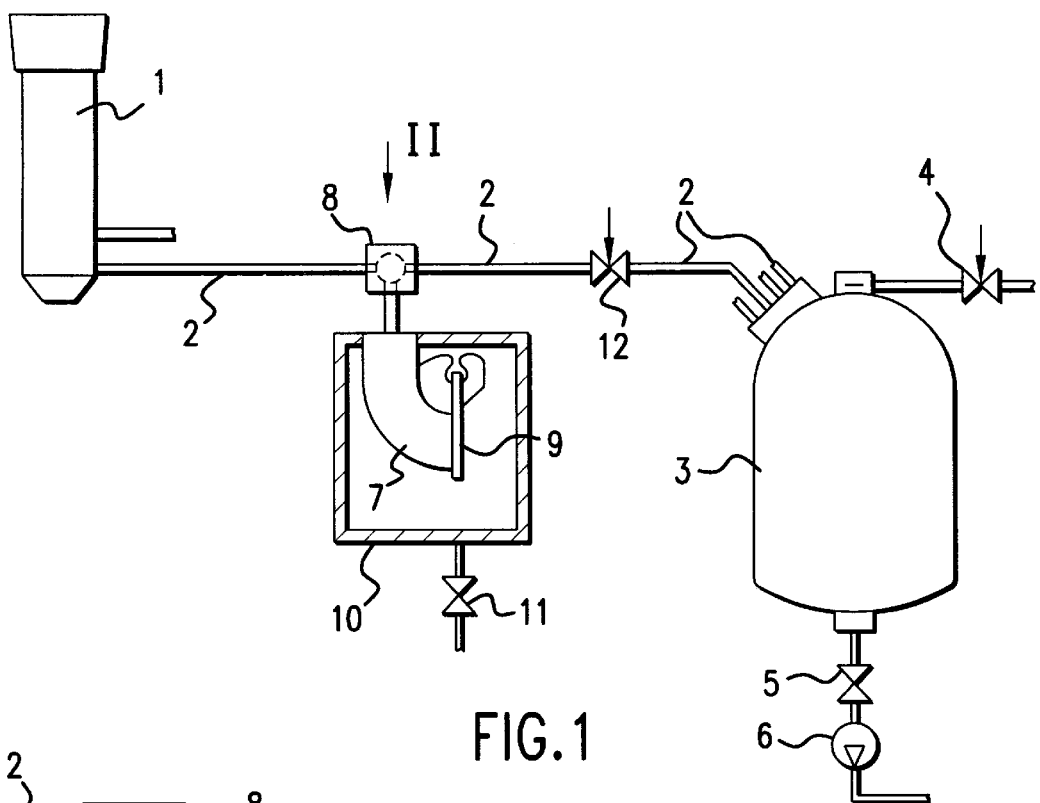
FIG. 1 shows schematically the milk line system between a teat cup and the milk container means.

FIG. 1 shows only one of the teat cups to be connected automatically to the teats of an animal to be milked by means of a (non-shown) milking robot. Like the other teat cups, this teat cup 1 is connected to milk container means 3 via a milk line 2. In the embodiment shown in this figure, the milk container means are constituted by a milk glass. The four milk lines 2 of the teat cups debouch into said milk glass 3, while the milk glass is furthermore connected via a valve 4 to the vacuum system (not shown) of the milking implement. From the milk glass 3 the milk is discharged to a (non-shown) milk tank via a valve 5 by means of a pump 6.

Figure 2:
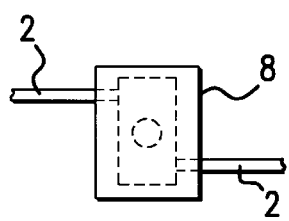
FIG. 2 is a plan view of the connecting element.

In each of the milk lines 2 there is included an auxiliary reservoir 7. In FIG. 1 this provision is only represented for one milk line. The content of the auxiliary reservoir is larger than the anticipated quantity of foremilk that is obtained at the start of the milking via the relevant teat cup 1. The content of the auxiliary reservoir is preferably approximately two to three times as large as the to be expected quantity of foremilk. Via a connecting element 8 the auxiliary reservoir 7 is in open connection with the relevant milk line 2. The connecting element 8 is constituted by a space to which the interrupted ends of a milk line 2 are connected. In the bottom of this space there is made an opening which is in direct connection with the auxiliary reservoir 7. As represented in FIG. 2, both ends of the milk line 2 are connected to the connecting element 8, in a substantially horizontal plane, so as to face each other in a staggering position. A valve 12 is thereby disposed between the connecting element 8 and the milk glass 3.

The auxiliary reservoir 7 is provided with an outlet valve 9 which closes off the auxiliary reservoir 7 because of the vacuum present in a milk line 2. When the valve 12 is closed and the vacuum in the milk line 2 is removed, the auxiliary reservoir 7 is no longer closed off by the outlet valve 9. Due to the pressure of the (fore)milk present in the auxiliary reservoir 7 the outlet valve 9 will easily deviate and the (fore)milk will flow into a collecting element 10. The (fore)milk collected in the collecting element 10 can be discharged via the valve 11 and a (non-shown) pump, in particular to an implement for supplying feed and/or beverage to an animal.

The milk yielded by means of the teat cups will not directly flow through to the milk container means 3 due to the presence of the connecting element 8 in the milk line 2 and the opening made in the lower side of said connecting element which is in connection with the auxiliary reservoir 7, due to the fact that the connecting element constitutes a resistance for the milk stream. Said resistance is realized by the staggering interruption, in a substantially horizontal plane, in the milk line 2. Therefore the milk obtained first will fill first the auxiliary reservoir 7 via the opening at the lower side of the connecting element, while the subsequent milk stream will flow through the connecting element 8 to the milk glass 3. In practice it has appeared that the milk flowing from the teat cup 2 to the milk glass 3 does not practically mix with the foremilk present in the lower part of the auxiliary reservoir.

When only the teat cups have to be cleaned, the teat cups are connected in a customary manner to rinsing members by means of which a rinsing fluid is guided in the teat cups and possibly also over the edge thereof. By closing the valve 12 provided behind the connecting element 8, the rinsing fluid can be discharged directly via the auxiliary reservoir 7; thereby the valve 11 will in principle be opened. In this manner a very quick rinsing fluid discharge is possible, so that the teat cups 1 can be cleaned easily and quickly after each milking run of an animal. In a similar manner drying air can be pressed through the teat cups and escape via the auxiliary reservoir 7. When the teat cups and the milk line system have to be cleaned, the teat cups are connected in a customary manner to rinsing members and now also included in a rinsing line system. Like the (fore)milk, the rinsing fluid will first fill the auxiliary reservoir 7 and then be guided further to the milk glass 3 and be discharged via the valve 5 and the pump 6. In this manner the teat cups and the lines connected thereto including the milk glass 3 will be rinsed. When cleaning of the teat cups and the milk line system has ended, rinsing fluid will remain in the auxiliary reservoir 7. When the rinsing members are disconnected from the teat cups and consequently the teat cups are again in open connection with the open air, so that the vacuum is removed from the milk line 2, the rinsing fluid will get into the collecting element 10 via the outlet valve 9, in the same manner as described above for the (fore)milk present in the auxiliary reservoir, and will be discharged via the valve 11. Thereby the valve 12 is in its closed position. When it is ensured that the rinsing fluid does not contain chemical components that are harmful for the animals and only consists of water including milk residues if any, the rinsing fluid collected in the collecting element 10 can also be supplied as drinking-water to the implement for supplying feed and/or beverage to the animals.

Figure 3:
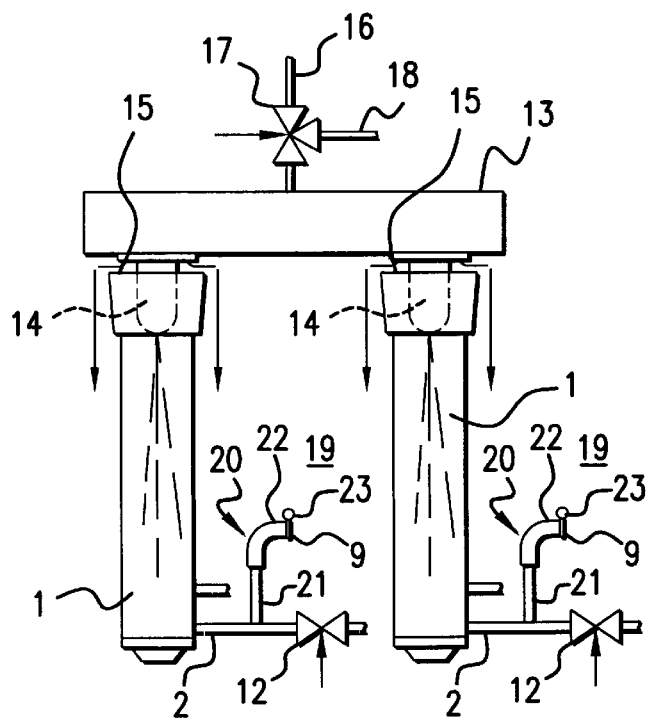
FIG. 3 shows schematically a second embodiment of a milk line system including a short rinsing fluid discharge line.

Referring to FIG. 3, in order to make it possible to clean the teat cups 1 and the milk lines 2 after each milking run by means of a cleaning fluid, a holder 13 for cleaning means can be connected to the teat cups 1. The holder 13 for cleaning means comprises spraying members 14, by means of which the inside of the teat cups 1, the milk lines 2, as well as the upper edge 15 of the teat cups 1 can be cleaned. The cleaning fluid is supplied to the spraying members 14 via a line 16, connected to the holder 13 for cleaning means. A computer-controlled three-way valve 17 is included in the line 16. To the computer-controlled three-way valve 17 there is further connected a line 18 through which drying air can be pressed to the spraying members 14. In each of the milk lines 2 there is further included a computer-controlled valve 12, by means of which a short rinsing fluid discharge line can be obtained by closing off the valve 12. The milk lines 2 between the teat cups 1 and the computer-controlled valves 12 have a length lying between 100 cm and 200 cm and preferably being 150 cm. To each of the milk lines 2, between the teat cup 1 and the computer-controlled valve 12, there is further connected a rinsing fluid discharge element 19. Said rinsing fluid discharge element 19 comprises a line 20, extending with a first portion 21 from a milk line 2 in upward direction. The first portion 21 merges into a second bent portion 22, whose end extends horizontally. The end of the second bent portion 22 is provided with an outlet valve 9 which is freely pivotable about a horizontal pivot shaft 23. During milking, the outlet valve 9 closes off the line 20 of the rinsing fluid discharge element 19 because of the vacuum present in the milk line 2. Due to the fact that the line 20 is disposed in upward direction relative to the milk line 2, there is not collected milk and/or foremilk in the line 20, like in the previous embodiment. The rinsing fluid discharge element 19 exclusively serves for discharging the rinsing fluid.

The function of the rinsing fluid discharge element 19 will be explained in what follows:

After each milking run the teat cups 1 as well as the first part of the milk lines 2 are cleaned by means of the holder 13 for cleaning means. To that end cleaning fluid is sprayed over the edges 15 of the teat cups 1 by means of the spraying members 14 for cleaning the outside of the teat cups 1, while by means of the spraying members 14 there is also sprayed a cleaning fluid, such as a water-caustic solution, into the teat cups 1 and the milk lines 2. After a fixed period of time the computer-controlled valves 12 are automatically closed so that the teat cups 1 and the portions of the milk lines 2 located between the teat cups and the computer-controlled valve 12 will completely be filled with cleaning fluid. Then the computer-controlled three-way valve 17 is operated so that the line 18 is connected with the holder 13 for cleaning means. In this manner, via the spraying members 14, there is brought drying air into the teat cups 1 and the milk line 2. By means of the drying air the rinsing fluid is pressed out of the teat cups 1 and the milk lines 2, such that by opening the outlet valves 9 the rinsing fluid is allowed to leave the milk lines 2. Due to the cleaning of the teat cups 1 and the milk lines 2 by blowing drying air, rinsing fluid residues are prevented from remaining in the teat cups and the milk lines 2, and from mixing with the milk, as a result thereof, during a next working run. After the teat cups 1 and the milk lines 2 have been cleaned, the holder 13 for cleaning means is removed, the computer-controlled valves 12 are opened and the teat cups 1 can again be connected to the teats of an animal to be milked, after which the valves 9 close automatically because of the vacuum in the milk lines 2.

The invention is by no means restricted to the embodiment shown in FIGS. 1, 2 and 3, but also relates to all the embodiments falling within the scope of the following claims. In particular for the auxiliary reservoir, all kinds of embodiments are possible, deviating from the specific embodiment, denoted by the reference numeral 7, shown in FIG. 1.

Having disclosed my invention, what I claim as new and to be secured by Letters Patent of the United States is:

1. An implement for milking animals comprising a milking compartment including a milking robot for automatically connecting teat cups to teats of an animal to be milked, said implement being additionally provided with milk container means for milk yielded, said milk container means connected via milk lines to each of said teat cups, and an auxiliary reservoir disposed in at least one milk line between a respective teat cup and said milk container means, a fixed quantity of said milk, obtained at a start of a milking process, being collected in said auxiliary reservoir and whereby said milk obtained thereafter being substantially guided to said milk container means.

2. An implement as claimed in claim 1, further comprising a corresponding auxiliary reservoir disposed in each of said milk lines, between a respective teat cup and said milk container means.

3. An implement as claimed in claim 1, wherein said auxiliary reservoir's capacity is larger than an anticipated quantity of foremilk.

4. An implement as claimed in claim 3, wherein said capacity of said auxiliary reservoir is in a range of approximately two to three times as large as said anticipated quantity of foremilk.

5. An implement as claimed in claim 1, wherein said auxiliary reservoir is in operative connection with said at least one milk line between said teat cup and said milk container means.

6. An implement as claimed in claim 5, further comprising a connecting element operatively connected to corresponding ends of said at least one milk line, said connecting element comprising, at its lower side, an opening to which said auxiliary reservoir is connected.

7. An implement as claimed in claim 6, wherein said corresponding ends of said at least one milk line are connected to said connecting element, in a substantially horizontal plane, so as to face each other in a staggered position.

8. An implement as claimed in claim 5, wherein said auxiliary reservoir comprises an outlet valve which closes off said auxiliary reservoir because of vacuum present in said at least one milk line.

9. An implement as claimed in claim 8, wherein said outlet valve opens an outlet opening of said auxiliary reservoir when, after milking, said teat cup operatively connects with ambient air.

10. An implement as claimed in claim 8, wherein said outlet valve opens an outlet opening of said auxiliary reservoir when said teat cup is operatively included in a rinsing system which is intended only for cleaning said teat cup.

11. An implement as claimed in claim 8, wherein said outlet valve opens an outlet opening of said auxiliary reservoir when said teat cup is operatively included in a rinsing system and rinsing of said teat cup and said milk line system connected thereto is ended.

12. An implement as claimed in claim 1 wherein said auxiliary reservoir comprises an outlet opening debouching into a collecting element.

13. An implement as claimed in claim 12, wherein foremilk separated by means of said auxiliary reservoir is supplied to an animal.

14. An implement as claimed in claim 12, wherein when said teat cup is operatively included in a rinsing line system, rinsing fluid discharged via said auxiliary reservoir is supplied to an animal.

15. An implement for milking animals, comprising a milking compartment and a milking machine including teat cups for automatically milking animals, and cleaning means for cleaning at least said teat cups and milk lines connected thereto, wherein in at least one milk line of said milk lines, between a teat cup and a computer-controlled valve included in said at least one milk line, there is disposed a rinsing fluid discharge element for discharging cleaning fluid supplied by said cleaning means.

16. An implement as claimed in claim 15, wherein said rinsing fluid discharge element comprises a closing element which closes off an outlet opening of said rinsing fluid discharge element because of vacuum present in said at least one milk line.

17. An implement as claimed in claim 16, wherein said closing element opens said outlet opening of said rinsing fluid discharge element when, after milking, said teat cup and said at least one milk line connected thereto are rinsed.

18. An implement as claimed in claim 15 wherein said rinsing fluid discharge element comprises a line connected with one end to said at least one milk line and whose other end comprises a closing element.

19. An implement as claimed in claim 18, wherein said line extends with a first portion from said at least one milk line in an upward direction, which said first portion merges into a second bent portion.

20. An implement as claimed in claim 18 wherein said closing element comprises, disposed near an end of a second bent portion of said line, a freely pivotal outlet valve.

21. An implement as claimed in claim 15 wherein said cleaning means comprise a holder for said cleaning means, said holder comprising spraying members which are connectable to said teat cups.

22. An implement as claimed in claim 21, further comprising a drying air line connected to said holder for said cleaning means, by means of said drying air line, after cleaning, rinsing fluid is discharged from aid teat cups and said milk lines to said rinsing fluid discharge element.

23. An implement as claimed in claim 15 further comprising a milking robot for automatically connecting said teat cups to teats of an animal to be milked, and respectively disconnecting same therefrom.

24. An implement as claimed in claim 1 further comprising a cleaning means, said cleaning means comprising a holder, said holder comprising spraying members, said spraying members being connectable to said teat cups.

25. An implement for removing foremilk from milk comprising;

means for automatically milking, via a teat cup, an animal, means for guiding both said foremilk and said milk in a flow from said teat cup to a milk line, means for interrupting said milk line, means for automatically removing said foremilk from said flow, means for guiding said milk from said means for interrupting said milk line to a milk container means.

26. An implement as claimed in claims 25 wherein said interrupting means filter comprises means for zigzagging, on a substantially horizontal plane, said milk's flow through said interrupting means.

27. An implement as claimed in claim 25 further comprising means for discharging and providing said foremilk to an animal for consumption.

28. An implement as claimed in claim 25 further comprising a rinsing means, said rinsing means rinsing said teat cup and said milk line.

29. An implement as claimed in claim 28 wherein said rinsing means comprises a rinsing fluid, said rinsing fluid and substances carried by said rinsing fluid being provided to an animal for consumption.

30. An implement for removing foremilk from milk comprising;

An automated milking machine comprising a teat cup, a first milk line, a connecting element, a second milk line, a valve, a milk container, an auxiliary reservoir, a further valve, a vacuum system, a rinsing system and a collecting element, said automated milking machine automatically and operatively placing said teat cup on a teat of said animal, said teat cup providing means to draw milk from said teat, said first milk line providing means to guide said milk away from said teat cup, said connecting element comprising an upper part and a lower part, said upper part being in open connection with said lower part, said upper part comprising two sides, a first and second side, said two sides substantially facing each other, said first milk line operatively connected to said first side, said second milk line operatively connected to said second side, said first milk line's connection to said first side and said second milk line's connection to said second side disposed staggered relative to each other on a substantially horizontal plane, said second milk line operatively connected to said milk container, and providing means to guide said milk to said milk container, said second milk line comprising said valve, said valve providing means to block fluid flow through said second milk line, said lower part being in open connection with said auxiliary reservoir, said auxiliary reservoir having a capacity significantly greater than an expected volume of foremilk drawn from said animal, said auxiliary reservoir further comprising said further valve disposed substantially at said auxiliary reservoir's bottom, said vacuum system providing means of forming a vacuum in said teat cup, said first milk line, said connecting element and said auxiliary reservoir, said vacuum providing means of positioning said further valve so as to block fluid flow into said collecting element.

31. An implement as claimed in claim 30 further comprising a drain connected to said collecting element and an apparatus for providing said foremilk to an animal for consumption.

32. A method for separating out foremilk from milk comprising;

milking an animal and guiding both said foremilk and said milk from a teat cup to a milk line, interrupting said milk line with a connecting element, and trapping said foremilk in an auxiliary reservoir connected to said connecting element, guiding said milk through said connecting element to a milk container means.

33. A method as claimed in claim 32 further comprising zigzagging, on a substantially horizontal plane, flow of said milk through said connecting element.

34. A method as claimed in claim 32 further comprising preventing a substantial amount of said milk, obtained subsequent to said foremilk in a milking turn, from entering said auxiliary reservoir.

35. A method as claimed in claim 32 further comprising draining said auxiliary reservoir after vacuum is removed from said milk line.

36. A method as claimed in claim 32 further comprising providing said foremilk to an animal for consumption.

37. A method as claimed in claim 32 further comprising trapping a rinsing fluid in said auxiliary reservoir and draining said auxiliary reservoir after said vacuum is removed from said milk line.

38. A method as claimed in claim 37 further comprising providing said rinsing fluid and substances carried by said rinsing fluid to an animal for consumption.

* * * * *